Figure 1:
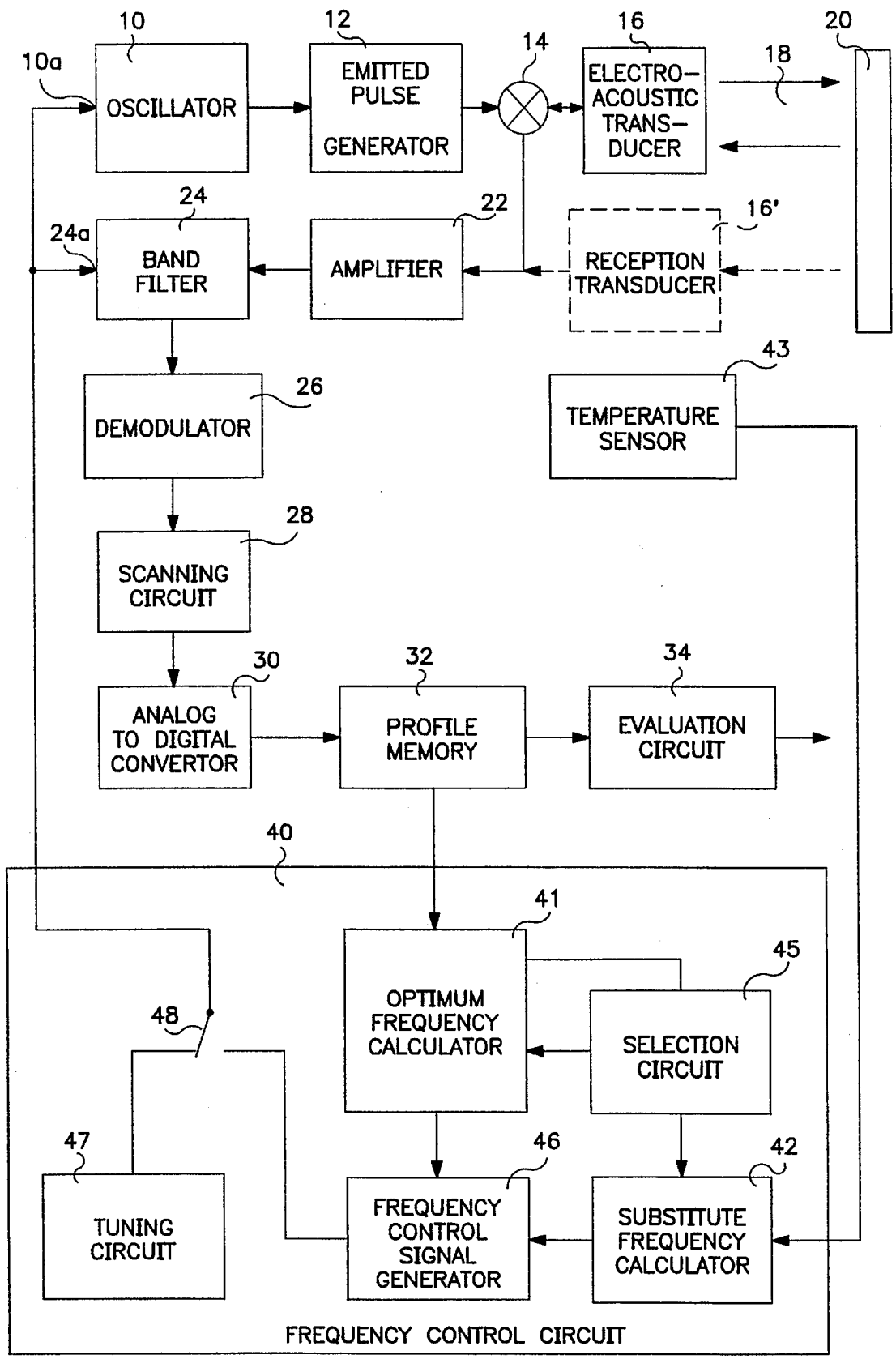

United States Patent
Michalski

[11] Patent Number: 5,511,041
[45] Date of Patent: Apr. 23, 1996

[54] PROCESS FOR SETTING THE TRANSMISSION FREQUENCY OF A DISTANCE MEASURING INSTRUMENT OPERATING ACCORDING TO THE ECHO-SOUNDING PRINCIPLE

[75] Inventor: Bernhard Michalski, Maulburg, Germany

[73] Assignee: Endress + Hauser GmbH + Co., Germany

[21] Appl. No.: 244,592

[22] PCT Filed: Sep. 28, 1993

[86] PCT No.: PCT/EP93/02630
§ 371 Date: Jun. 1, 1994
§ 102(e) Date: Jun. 1, 1994

[87] PCT Pub. No.: WO94/08252
PCT Pub. Date: Apr. 14, 1994

[30] Foreign Application Priority Data
Oct. 2, 1992 [DE] Germany ............. 42 33 257.5

[51] Int. Cl.⁶ .................................. G01S 15/08
[52] U.S. Cl. ............................ 367/99; 367/97
[58] Field of Search .............. 367/95, 97, 99, 367/901

[56] References Cited

U.S. PATENT DOCUMENTS 4,901,245  2/1990  Olson et al. ............ 367/908
4,905,208  2/1990  Dick ..................... 367/101

FOREIGN PATENT DOCUMENTS 0380441  8/1990  European Pat. Off.
63-032386 2/1988  Japan.
WO90/08966 8/1990  WIPO.

*Primary Examiner*—Daniel T. Pihulic
*Attorney, Agent, or Firm*—Barnes & Thornburg

[57] ABSTRACT

In order to set a range finding instrument operating according to the echo-sounding principle using sonic or ultrasonic pulses to an optimum transmission frequency, the transmission frequency is altered stepwise within a predetermined frequency range. During each reception spell following on the transmission of a sonic or ultrasonic pulse an amplitude-time-profile of the received signals is formed and integrated. The integration values obtained for the various transmission frequencies are stored, and an optimum transmission frequency is set to that frequency at which the maximum integrated value is obtained. In order to eliminate the effects of background noise on the determination of the optimum transmission frequency a mean noise amplitude of the received signals is determined and subtracted from the amplitude-time-profile of the received signals before integration.

25 Claims, 2 Drawing Sheets

PROCESS FOR SETTING THE TRANSMISSION FREQUENCY OF A DISTANCE MEASURING INSTRUMENT OPERATING ACCORDING TO THE ECHO-SOUNDING PRINCIPLE

This invention relates to a process for setting the transmission frequency of a distance measuring instrument operating according to the echo-sounding principle, including at least one electro-acoustic transducer for emitting sonic or ultrasonic pulses and for converting received sonic or ultrasonic signals into electric received signals, a frequency-adjustable oscillator for generating an electric signal having the transmission frequency of the sonic or ultrasonic pulses which are to be transmitted for activating the electro-acoustic transducer, and an evaluation circuit for determining the travelling time of the sonic or ultrasonic pulses as a measure of the distance of a target object, the optimum transmission frequency being determined and tuned in the oscillator by analysing received signals obtained at different transmission frequencies.

A process of this nature is known from the PCT publication WO 90/08966. In contrast to other known processes in which the transmission frequency is adjusted to the resonance frequency of the electro-acoustic transducer, or is controlled as a function of the temperature of the transducer according to a known predetermined temperature characteristic curve for the electro-acoustic transducer, this process has the advantage that the entire measuring sequence comprising a transmitter, an interface with an acoustic space, a path to and from the reflective target object together with a receiver is involved in determining the transmission frequency. The solutions described in this publication are confined, however, to certain special cases. Thus, for determining echoes in the decaying range of the electro-acoustic transducer the most favourable higher or lower harmonic frequency for operating the system is to be determined by analysing the performance of the transducer and the receiver at the higher or lower harmonic frequencies within a predetermined frequency range; alternatively, when measuring echoes at low signal-to-noise ratios, the parameters characterising the background noise are to be determined and the pulse form and carrier frequency are to be adjusted in accordance with these parameters. No concrete solutions are disclosed, however, as to how the analyses are to be performed or how the parameters are to be determined, or how the transmission frequency can be determined as a function of the results obtained.

The present invention has as an object the provision of a process of the nature described above, which in a simple manner and using minimal circuitry permits an analysis of received signals, immediately providing the optimum transmission frequency.

This is attained according to the invention in that during the analysis of the received signals in each reception interval following the emission of a sonic or ultrasonic pulse the amplitude-time profile of the received signals is formed and integrated, that the integrated values obtained for different transmission frequencies are stored and that the transmission frequency of the oscillator is tuned to that frequency at which the maximum integrated value is attained.

In the process according to the invention the fact may advantageously be utilised that it is increasingly becoming the practice in recently adopted processes of distance measuring according to the echo-sounding principle to form the amplitude-time-profile of the received signals and to process these in order to determine the required echo and to determine its travelling time. Apparatus available for this purpose may also be utilised for the direct analysis of the received signals using the method according to the invention. The only additional measures are confined to integrating the amplitude-time-profiles for signals received at different transmission frequencies, and determining the transmission frequency at which the maximum integrated value is obtained. These measures require no additional circuitry if effected by suitably programming the computer forming the evaluation circuitry in the normal measuring procedure. This is readily feasible since the analysis of the signals received for determining the optimum transmission frequency is performed during special frequency control intervals during which no distance measurement takes place. The frequency control intervals may be spaced apart by fairly large time intervals since conditions affecting optimum transmission frequencies generally change slowly.

The process according to the invention further allows elimination in a simple manner of the background noise effects on the analysis of received signals, if the background noise level is so high that it impairs the determination of the optimum transmission frequency. In that case, in a preferred method of practising the invention, the mean noise amplitude is determined and is subtracted from the amplitude-time-profile of the received signals before the former is integrated. Since the background noise is independent of the transmission frequency the mean background noise amplitude for each determination of an optimum transmission frequency need only be determined once.

Preferred embodiments and developments of the invention are set out in the subsidiary claims.

Figure 2:
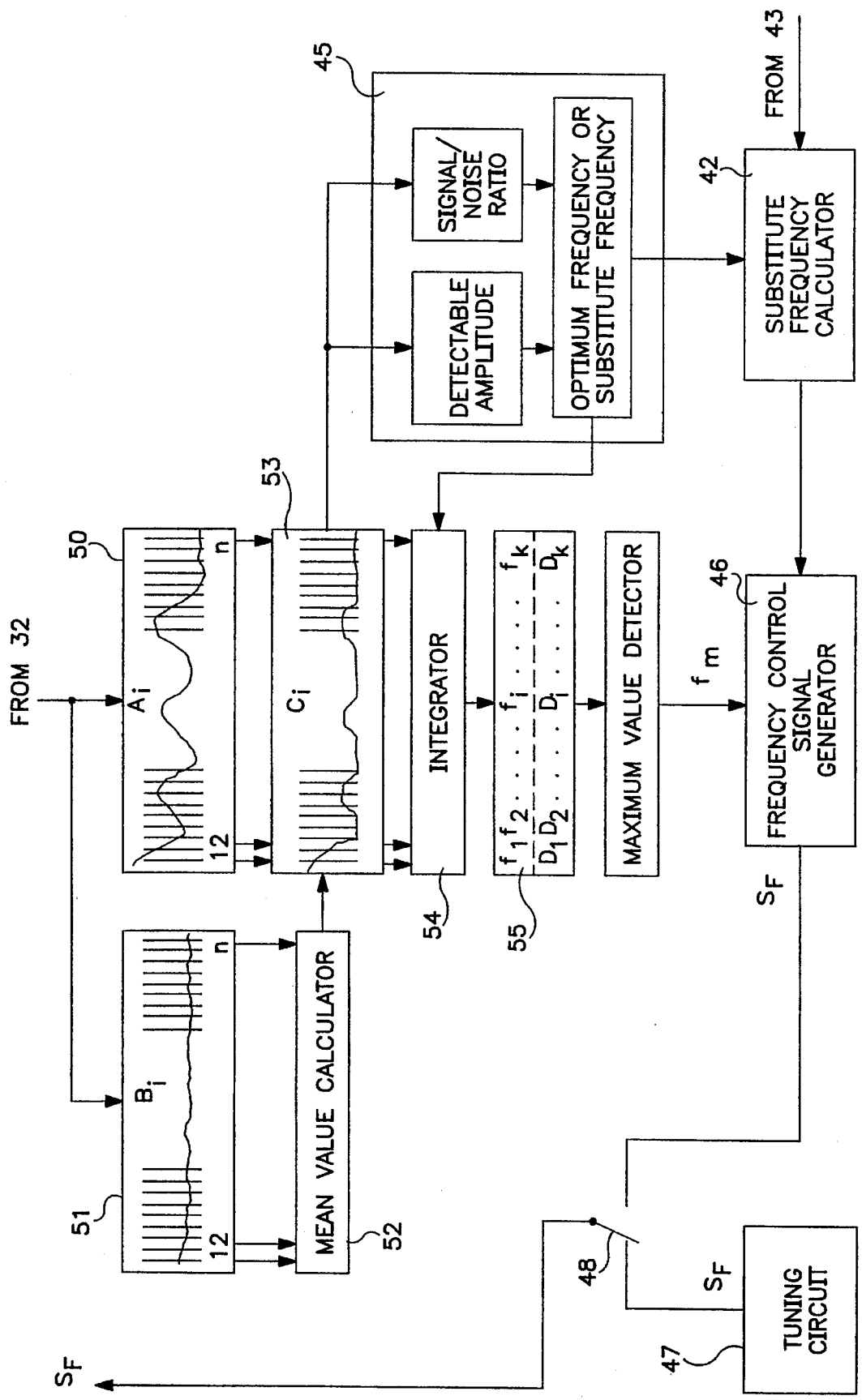

Further features and advantages of the invention are apparent from the description of a performance example set out below with reference to the drawings. In the drawings:

FIG. 1 shows a block circuit diagram of a distance measuring instrument operating according to the echo-sounding principle, in which a method according to the invention is applied, and FIG. 2 shows a detailed block circuit diagram of the frequency control circuit contained in the distance measuring instrument of FIG. 1.

A distance measuring instrument operating according to the echo-sounding principle using sonic or ultrasonic pulses, the block circuit diagram of which is shown in FIG. 1, includes an oscillator 10, the frequency of which is adjustable by means of a frequency control signal $S_F$, fed to a control input 10a. The output of the oscillator 10 is connected to an emitter pulse generator 12 which produces periodic electrical emitter pulses having a short duration in relation to the time occupied by the emitter pulses, and the carrier frequency of which is the frequency generated by the oscillator 10. The emitter pulses pass through a duplexer 14 to an electro-acoustic transducer 16 which functions alternately as a transmission transducer and a receiver transducer. The transducer 16 converts each emitter pulse produced by the emitter pulse generator 12 into a sonic or an ultrasonic pulse which is emitted by the transducer 16 during a given transmission spell. Each transmission spell is followed by a reception spell during which the transducer 16 converts all sonic or ultrasonic signals which it receives into electric receiver signals. These include more particularly the sonic or ultrasonic oscillations of the emitter pulse which, after having traversed an acoustic pathway 18, are reflected by a target object 20 whose distance is to be measured, or by interfering objects, and further including, stray signals from other sources, as well as self-induced oscillations of the transducer, particularly reverberations of the transducer on completion of an emitter pulse. The duration of each reception spell must be more than twice the time for the sonic or ultrasonic oscillations to travel from the transducer 16 to the target object 20 over the largest occurring measuring distance.

The electrical received signals emitted by the transducer 16 during each reception spell are fed through the duplexer 14 to the input of an amplifier 22. The duplexer 14 prevents emitter pulses generated by the emitter pulse generator 12 from directly reaching the input of the amplifier 22. Instead of alternately operating the transducer 16 as a transmission transducer and a reception transducer it is also feasible to use it as a transmission transducer only and to provide a second electro-acoustic transducer 16' as a reception transducer, as indicated in FIG. 1 in broken outline. In this case the duplexer 14 and its connection to the amplifier 22 is omitted, and the input of the amplifier 22 is connected to the output of the reception transducer 16' instead.

The received signals amplified by the amplifier 22 pass through a band filter 24 of narrow bandwidth of which the mean frequency is adjustable by means of a control signal applied to its control input 24a. The control input 24a to the band filter 24 receives the same frequency control signal $S_F$ as does the control input 10a of the oscillator 10, so that the mean frequency of the band filter 24 always corresponds exactly to the frequency of the oscillator 10 and hence to the frequency of the sonic or ultrasonic signals emitted by the transducer 16. The band filter 24 serves to select signals received at the actually transmitted frequency and to suppress all signals received at other frequencies.

Those received signals passing through the band filter 24 are demodulated in a demodulator 26. The demodulator 26 emits at the output a signal corresponding to the envelopment curve of the demodulated received signals. The demodulator 26 is followed by a scanning circuit 28, which derives a series of scanned values from the envelopment curve signal in the course of each reception spell, which are preferably equally spaced from each other. Each scanned value has the amplitude of the envelopment curve signal at the time of scanning. An analog-to-digital converter 30 following onto the scanning circuit 28 converts each scanned value into a digital code group representing a number of which the numerical value corresponds to the amplitude of the scanned value. The digital code groups produced by the analog-to-digital converter 30 in the course of each reception spell are fed to a profile memory 32 and stored there. These stored code groups constitute the amplitude-time-profile of the received signals obtained during a reception spell and filtered by the band filter 24.

An evaluation circuit 34 is connected to the profile memory 32, and serves to recognise the output echo reflected by the target object 20 within the amplitude-time-profile stored in the profile memory 32, to determine the travelling time of the output echo, and to calculate the distance of the target object from this travelling time. Various solutions are known for this purpose and will be familiar to those skilled in the art.

The profile memory 32 is further connected to a frequency control circuit 40 which at the output produces a frequency control signal $S_F$ which is fed to the control input 10a of the oscillator 10. For the sake of a better understanding of the frequency control circuit, which is discussed below with reference to FIG. 2, it is shown in FIG. 1 that the frequency control circuit 40 comprises the following circuit elements: an optimum frequency calculator 41 connected to the profile memory 32; a substitute frequency calculator 42 connected to a temperature sensor 43 for measuring the temperature of the electro-acoustic transducer 16; a selection circuit 45 for deciding on the strength of information which it receives from the optimum frequency calculator 41 whether either an optimum frequency calculated by the optimum frequency calculator 41, or a substitute frequency calculated by the substitute frequency calculator 42, is to be applied for the generation of the frequency control signal $S_F$ by means of a frequency control signal generator 46; a tuning circuit 47, and a selection switch 48 which, depending on its position, transmits to the oscillator 10 a frequency control signal $S_F$ produced either by the frequency control signal generator 46, or by the tuning circuit 47. However, these circuit elements are generally not found as concrete items in the frequency control circuit; in reality, the frequency control circuit 40 is preferably constituted by a micro-computer, programmed in such a manner that it performs the functions set out above. A micro-computer providing the required evaluation circuit 34 in the measuring operation may be utilised for this purpose.

The determination of a transmission frequency to be set up in the oscillator 10 occurs during special frequency control spells during which no distance measurement takes place. For this purpose use is made of the fact that the conditions determining the optimum transmission frequency change only gradually, if at all, so that it is sufficient after a first determination of the optimum transmission frequency to check it at fairly long time intervals and to adjust it if necessary.

During each frequency control spell the selection switch 48 is set in such a manner that the frequency control signal $S_F$ is delivered by the tuning circuit 47. The tuning circuit 47 causes a stepwise adjustment of the transmission frequency, commencing from a base frequency. An emitter pulse is transmitted at each set up frequency, and the received signals corresponding to this emitter pulse are evaluated in the manner described below. The evaluations obtained at various frequencies are stored and compared with each other on completion of a frequency control spell. The frequency for which the best evaluation is obtained is then used by the frequency control signal generator 46 for the production of the frequency control signal. Should it not be possible in certain cases to obtain an optimum transmission frequency by evaluation of the received signals the selection circuit 45 ensures that a substitute frequency determined by the substitute frequency calculator 42 is utilised as a substitute for generating a frequency control signal in the frequency control signal generator 46. On completion of the frequency control spell the selection switch 48 is set in its alternate condition so that henceforth the frequency control signal $S_F$ obtained from the frequency control signal generator 46 determines the transmission frequency of the oscillator 10 until the next frequency control spell.

The mode of operation of the frequency control circuit 40 shown in FIG. 1 is explained with reference to the detailed circuit block diagram of FIG. 2. The circuit block 50 denotes a profile memory into which, in the course of each frequency control interval, the amplitude-time-profiles of the received signals stored in the profile memory 32 are transferred sequentially. An amplitude-time-profile is depicted schematically within the circuit block 50 of signals received during a receiving spell after the transmission of an emitter pulse at a transmission frequency determined by the tuning circuit 47. The continuous curve represents the envelopment curve of the received signals, and the vertical bars represent the code groups $A_1, A_2, \ldots, A_i, \ldots, A_n$ of the digitised scanned values stored in the profile memory, as derived from the envelopment curve. Each code group denotes a digital number having a numerical value corresponding to the amplitude of the envelopment curve at a specific point.

The amplitude-time-profile stored in the profile memory 50 can be used directly for the determination of an optimum transmission frequency if the noise level is so low that it does not constitute an interference. FIG. 2 shows an additional measure which may be applied at higher noise levels in order to eliminate the effect of noise on the determination of an optimum transmission frequency. This measure involves determining a mean noise amplitude and deducting it from the amplitude-time-profile of the signals received prior to its integration. Since the mean noise amplitude is independent of the transmission frequency and does not vary significantly in the course of the frequency control spell it is sufficient to determine it once at the commencement of each frequency control spell and to store it for the duration of the frequency control spell. The determination of the mean noise amplitude may be effected by measuring it during a time interval during which noise signals definitely occur exclusively. FIG. 2 shows a further possibility for the determination of a mean noise level. This involves recording the amplitude-time-profile of signals received during a reception spell not preceded by an emission pulse transmission so that the received signals consist entirely of noise signals. For the purposes of a better understanding it is assumed in FIG. 2 that this amplitude-time-profile is transferred to a second profile memory denoted by the circuit block 51. In the circuit block 51 as in the circuit block 50, the envelopment curve obtained in this case together with the coded groups $B_1, B_2, \ldots, B_i, \ldots, B_n$ stored in the profile memory of the digitised scanned values of the envelope curve are shown. A mean value calculator 52 is connected to the profile memory 51 which determines the mean value of the calculated amplitude value stored in the profile memory 51; this is effected by a simple addition of the numerical values, represented by the stored code groups, and dividing the sum by the number of code groups:

$$B_m = \left( \sum_{1-n} B_i \right) / n$$

The resultant value $B_m$ is the mean value of the noise amplitude, which is stored in the form of a digital code group in the mean value calculator 52, and remains available throughout the entire frequency control spell.

The amplitude-time-profile stored in the profile memory 50 is transferred to a profile memory 53 with simultaneous subtraction of the mean noise amplitude from each stored amplitude value. In this way the code groups $C_1, C_2, \ldots, C_i, \ldots, C_n$ stored in the profile memory 53 represent the amplitude values $$C_i = A_i - B_m$$

An envelopment curve corresponding to these amplitude values is also shown in the circuit block 53, corresponding to the difference between the amplitude-time-profile of the received signals and the mean noise amplitude.

The transfer of the amplitude-time-profile of the received signals into the profile memory 50 and the derivation of the subtracted profile in the profile memory 53 is repeated at each transmission frequency $f_1, \ldots, f_i, \ldots, f_k$ determined by the tuning circuit 47 during a frequency control spell. On the other hand, the derivation of the amplitude-time-profile of the noise signals in the profile memory 51 and the calculation of the mean noise amplitude in the mean value calculator 52 occurs only once, at the start of each frequency control spell.

An integrator 54 derives an integrated value of the amplitude-time-profile stored in the profile memory 53 for each transmission frequency $f_i$. This is done by simply adding up the numerical values of the stored code groups:

$$D_i = \sum_{1-n} C_i$$

Each integrated value $D_i$ so obtained is stored in a memory 55 together with the associated frequency $f_i$.

At the end of each frequency control spell a maximum value detector 56 determines the largest of the integrated values $D_1, \ldots, D_i, \ldots, D_k$ contained in the memory 55, and transmits the frequency $f_m$ associated with this maximum integrated value $D_m$ to the frequency control signal generator 46, which produces a frequency control signal $S_F$, which effects the setting of the frequency $f_m$ as the optimum transmission frequency of the oscillator 10.

These processes only proceed in the described manner, however, if they are permitted by the selection circuit 45. The selection circuit 45 verifies for each differential profile contained in the profile memory 53 whether after subtraction, it contains echo signals having adequate amplitude values and whether a sufficiently large signal/noise ratio exists. Whenever either of these conditions is not met by a differential profile, the selection circuit 45 blocks the calculation of an integrated value by the integrator 54. It then causes the calculation of a substitute frequency by the substitute frequency calculator 42, and terminates the frequency control spell. The frequency control signal generator 46 produces a frequency control signal $S_F$ which effects in the oscillator the setting up of the substitute frequency as a transmission frequency. Various possibilities exist for calculating the substitute frequency, and the selection is left to a person skilled in the art. If it was not previously possible to determine and set up an optimum transmission frequency then the substitute frequency may be derived by using the temperature of the electro-acoustic transducer measured by the temperature sensor 43, and a characteristic temperature curve of the transducer stored in the substitute frequency calculator. If an optimum transmission frequency has been previously determined, however, this previous transmission frequency may be retained as a substitute frequency.

In the absence of any noise the mean noise amplitude is zero. In this case the derived differential profile in the profile memory 53 is identical to the amplitude-time-profile in the profile memory 50, and the integrator 54 integrates this amplitude-time-profile. It is accordingly feasible, particularly at low noise levels to do away with the determination and subtraction of the mean noise level, as occurs in the embodiment of FIG. 2 by simply omitting the circuits 51, 52 and 53. A further possibility exists wherein the selection circuit 45, based on the determined signal/noise ratio, determines whether the mean noise amplitude should be calculated and subtracted from the amplitude-time-profile or not.

I claim:

1. A process for determining and setting an optimum transmission frequency of a distance measuring instrument operating according to an echo-sounding principle, including at least one electro-acoustic transducer for emitting sonic or ultrasonic pulses and for converting received sonic or ultrasonic signals into electric received signals, a frequency-adjustable oscillator for generating an electric signal having a frequency corresponding to the transmission frequency of the sonic or ultrasonic pulses which are to be transmitted for activating the electro-acoustic transducer, and an evaluation circuit for determining the travelling time of the sonic or ultrasonic pulses as a measure of the distance of a target object, the process for determining and setting the optimum transmission frequency comprising the steps of generating an amplitude-time-profile of the received signals during each of a plurality of reception intervals following the emission of a sonic or ultrasonic pulse, integrating each amplitude-time-profile to produce a plurality of integrated values for different transmission frequencies, storing the integrated values, and tuning the transmission frequency to a selected frequency corresponding to a maximum integrated value.

2. A process according to claim 1, wherein an envelopment curve of the received signals is scanned in order to form each amplitude-time-profile, the scanned values are converted to digital values, and the digital scanned values are stored.

3. A process according to claim 1, wherein a mean noise amplitude of the received signals is determined and a difference between the amplitude-time-profile of the received signals and the mean noise amplitude is integrated.

4. A process according to claim 3, wherein the noise amplitude of the received signals is determined at a time at which no echo signals attributable to a transmitted sonic or ultrasonic pulse are received.

5. A process according to claim 3, wherein the mean noise amplitude is determined by forming the amplitude-time-profile formed of the received signals during a receiving spell prior to which no emission of a sonic or ultrasonic pulse has occurred.

6. A process according to claim 1, wherein the received signals are passed through a band filter tuned to the frequency of the oscillator prior to the formation of the amplitude-time-profile.

7. A process according to claim 1, wherein the optimum transmission frequency is determined during frequency control spells during which no distance measurement takes place.

8. A process according to claim 7, wherein the transmission frequency is adjusted stepwise during each frequency control spell, within a predetermined frequency range commencing from a starting frequency.

9. A process according to claim 1, wherein a substitute frequency is set in the oscillator whenever the optimum transmission frequency of the received signals cannot feasibly be determined.

10. A process according to claim 9, wherein the substitute frequency is determined on the basis of measuring the temperature of the electro-acoustic transducer as a function of a given characteristic temperature curve of the transducer.

11. A process according to claim 2, wherein a mean noise amplitude of the received signals is determined and a difference between the amplitude-time-profile of the received signals and the mean noise amplitude is integrated.

12. A process according to claim 2, wherein the received signals are passed through a band filter tuned to the frequency of the oscillator prior to the formation of the amplitude-time-profile.

13. A process according to claim 3, wherein the received signals are passed through a band filter tuned to the frequency of the oscillator prior to the formation of the amplitude-time-profile.

14. A process according to claim 4, wherein the received signals are passed through a band filter tuned to the frequency of the oscillator prior to the formation of the amplitude-time-profile.

15. A process according to claim 5, wherein the received signals are passed through a band filter tuned to the frequency of the oscillator prior to the formation of the amplitude-time-profile.

16. A process according to claim 2, wherein the optimum transmission frequency is determined during frequency control spells during which no distance measurement takes place.

17. A process according to claim 3, wherein the optimum transmission frequency is determined during frequency control spells during which no distance measurement takes place.

18. A process according to claim 4, wherein the optimum transmission frequency is determined during frequency control spells during which no distance measurement takes place.

19. A process according to claim 5, wherein the optimum transmission frequency is determined during frequency control spells during which no distance measurement takes place.

20. A process according to claim 2, wherein a substitute frequency is set in the oscillator whenever the optimum transmission frequency cannot feasibly be determined.

21. A process according to claim 3, wherein a substitute frequency is set in the oscillator whenever the optimum transmission frequency cannot feasibly be determined.

22. A process according to claim 4, wherein a substitute frequency is set in the oscillator whenever the optimum transmission frequency cannot feasibly be determined.

23. A process according to claim 5, wherein a substitute frequency is set in the oscillator whenever the optimum transmission frequency cannot feasibly be determined.

24. A process according to claim 8, wherein a substitute frequency is set in the oscillator whenever the optimum transmission frequency cannot feasibly be determined.

25. A process for determining and setting an optimum transmission frequency of a distance measuring instrument operating according to an echo-sounding principle, including an electro-acoustic transducer for emitting sonic or ultrasonic pulses and for converting received sonic or ultrasonic signals into electric received signals, a frequency-adjustable oscillator for generating an electric signal for activating the electro-acoustic transducer, the oscillator signal having a frequency proportional to the transmission frequency of the sonic or ultrasonic pulses emitted by the transmitter, the process comprising the steps of:

generating an amplitude-time-profile of the received signals during each of a plurality of reception intervals;

integrating each amplitude-time-profile to produce a plurality of integrated values corresponding to different transmission frequencies;

selecting a maximum integrated value from the plurality of integrated values; and adjusting the frequency of the oscillator to a frequency corresponding to the selected maximum integrated value.

* * * * *